Figure 1:
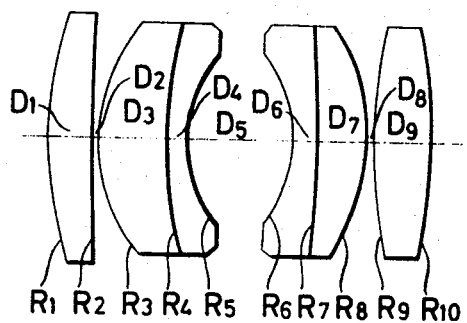

# United States Patent
Kawabe et al.

[15] 3,652,151
[45] Mar. 28, 1972

[54] PHOTOGRAPHIC LENSES PRIMARILY UTILIZING LIGHT OF SHORTER WAVELENGTHS

[72] Inventors: Tadasi Kawabe, Ako; Akira Tajima, Kawasaki, both of Japan

[73] Assignee: Canon Kabushiki Kaisha, Tokyo, Japan

[22] Filed: May 26, 1970

[21] Appl. No.: 40,619

[30] Foreign Application Priority Data

June 2, 1969 Japan..................................44/42529

[52] U.S. Cl..............................................350/222, 350/2
[51] Int. Cl...........................................G02b 9/42, G02b 1/02
[58] Field of Search.......................350/2, 175 NG, 222, 221

[56] References Cited

UNITED STATES PATENTS 2,416,032 2/1947 Warmisham et al......................350/2

Primary Examiner—David Schonberg
Assistant Examiner—Ronald J. Stern
Attorney—Toren & McGeady

[57] ABSTRACT

The disclosed photographic lens assembly passes light of shorter wavelengths, one lens made of magnesium oxide crystal which forms positive lens in the lens assembly. A first lens group in the assembly is composed of a positive meniscus lens which is convex on the side of the object. A second lens group is composed of a positive and a negative lens cemented together. A third lens group is composed of a negative lens cemented to a positive lens with the group overall being concave toward an object. A fourth lens group is composed of a double convex lens. The cemented surfaces of the second group and of the third group have curvatures whose algebraic sum is less than a given value.

2 Claims, 6 Drawing Figures

PHOTOGRAPHIC LENSES PRIMARILY UTILIZING LIGHT OF SHORTER WAVELENGTHS

The present invention relates to photographic lenses, and particularly to lenses suitable for use in photographing flying spots on a Brown tube and in duplicating and photographing under illumination with a light which is rich in shorter wavelength components such as from a mercury lamp and a special fluorescent lamp.

This sort of lens, however, requires a large aperture ratio such as F 1.8 in accordance with the illuminating light and the photosensitive material suitable to the light. To correct the aberration a large aperture ratio, positive lenses in the lens system are usually made of a lanthanum glass of a high refractive index and low dispersion. Glasses of this composition readily absorb light of shorter wavelengths and therefore are not suitable to the present purpose. So far either the positive lenses were made of a glass of relatively low refractive index which absorbs less light of shorter wavelengths at the sacrifice of performance or the number of the positive lenses were increased so as not to sacrifice the performance.

The present invention is characterized by utilizing a crystal of magnesium oxide (MgO) as the material for at least one positive lens of the composite lens system. This obviates the above cited defects and furnishes a lens which has good transparency to light of shorter wavelengths and is satisfactory with respect to correction of the aberration and of which fewer as required to form a lens system.

The advantages of magnesium oxide crystal as employed for the composing material of positive lenses are as follows.

1. High refractive index and low dispersion (the refractive index for 385 m$\mu$ is 1.76603 and the Abbe's number is 53.5) of the material permit a smaller spherical aberration when used for a positive lens. This permits the aperture ratio of the whole system to be easily increased. Further, since the Petzval sum can be made small, the curvature of field and the astigmatism can be easily removed and the lens systems can be readily achromatized with a good effect.

2. Remarkably good transparency toward shorter wavelength light. For a light of 350 m$\mu$, the transparency of a conventional lanthanum glass of a 10 mm. thickness, of which values of refractive index and dispersion are almost equal to those of crystal of magnesium oxide, is less than 50 percent, while that of a magnesium oxide crystal is 80 percent.

3. The number of positive lenses to be used in a lens system can be minimumized because of high refractive index and low dispersion of the material. Hence, the decreased total length and diameter of the lens system enables a smaller assembly possible.

It is desirable to meet the following arrangements and conditions to obtain better results from the present invention.
Arrangement.

| | |
|---|---|
| The first lens group: | Comprising a single positive lens. |
| The second group: | Comprising a positive lens and a passive lens |
| The third lens group: | Comprising a positive lens and a passive lens, both the first face and the last face being concave on the side of an object. |
| The fourth lens group: | Comprising a single positive lens. |

Conditions.
1. The average index of refraction of the positive lens is more than 1.65.
2. The absolute difference in the Abbe's number between the positive and passive lenses is more than 10.
3. The average of the total absolute radius values of the last face of the second group and of the first face of the third group is between 0.25–0.35.

Condition 1. is desirable for maintaining lower the Petzval sum so as to remove astigmatism and for improving spherical aberration. With indices of refraction less than 1.65 the picture qualities lower and a large aperture ratio is hard to obtain.

Condition 2. is desirable for avoiding an axial chromatic aberration and a lateral chromatic aberration. At less than 10, it is hard to achromatize the lens system.

Condition 3. is desirable for maintaining the Petzval sum in a good order, compensating for the aberrations appropriately and maintaining the optinum balance. Below the lower limit, the power of each face of the lens is increased and a spherical abberation tends to occur, although the Petzval sum may be rendered smaller. Beyond the upper limit, the Petzval sum becomes too large and astigmatism tends to occur and only poor image qualities are obtained.

A numerical example with respect to a six-membered Gaussian lens system embodying the present invention so that the best correction of aberration is achieved at the magnification 1/10 and its neiborhood is shown below.

Figure 2:
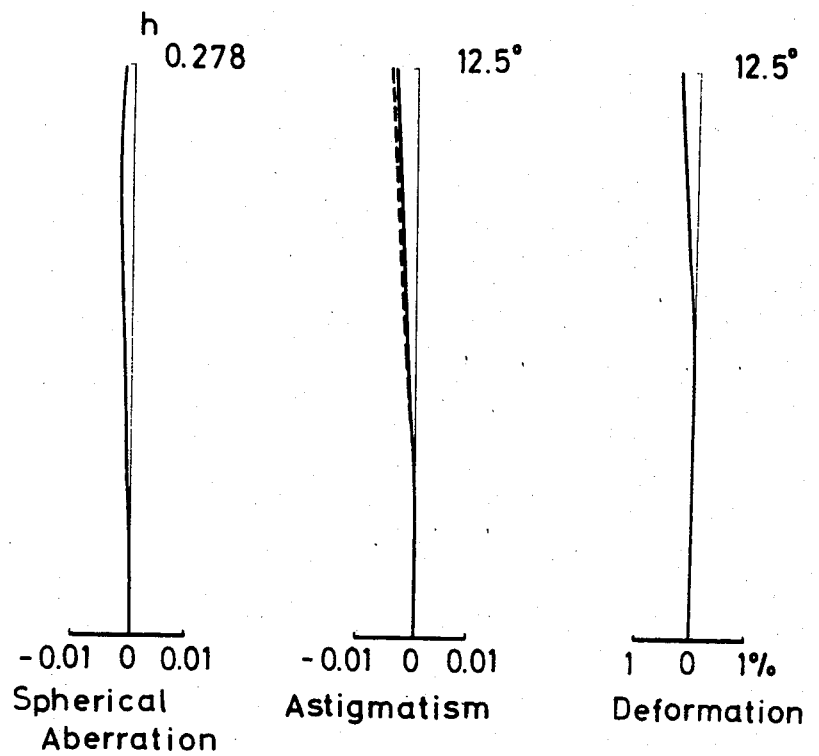
Figure 3:
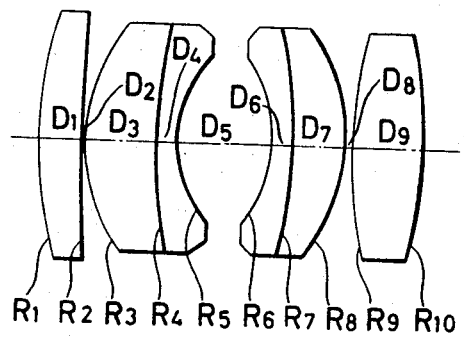
Figure 4:
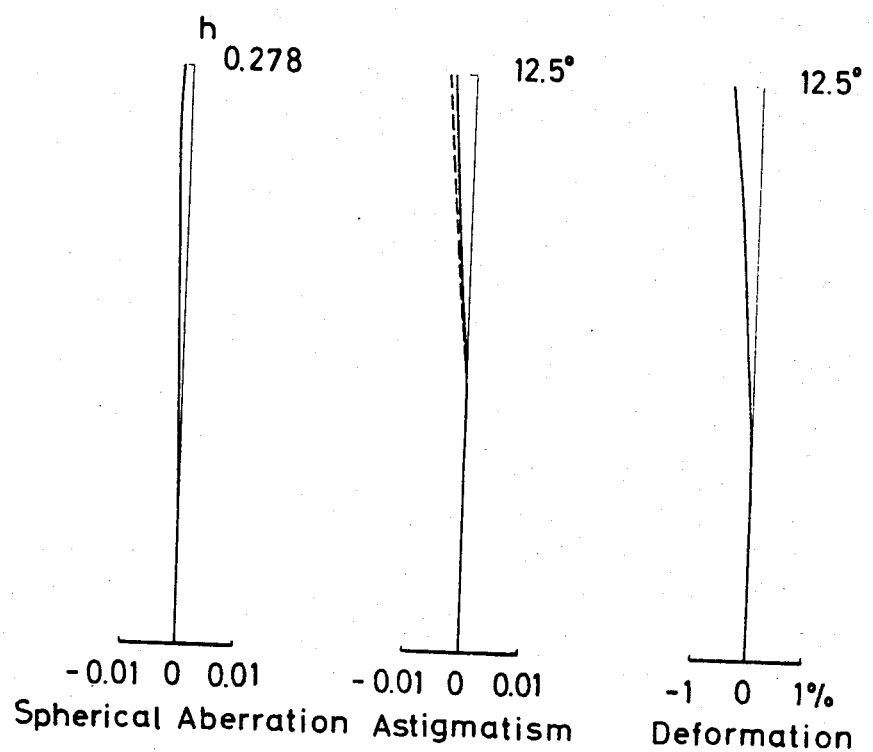
Figure 5:
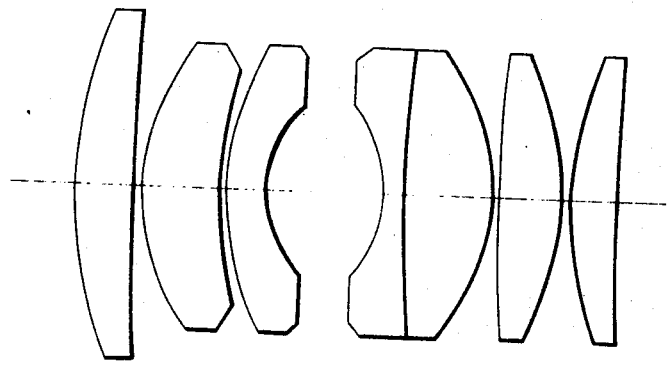
Figure 6:
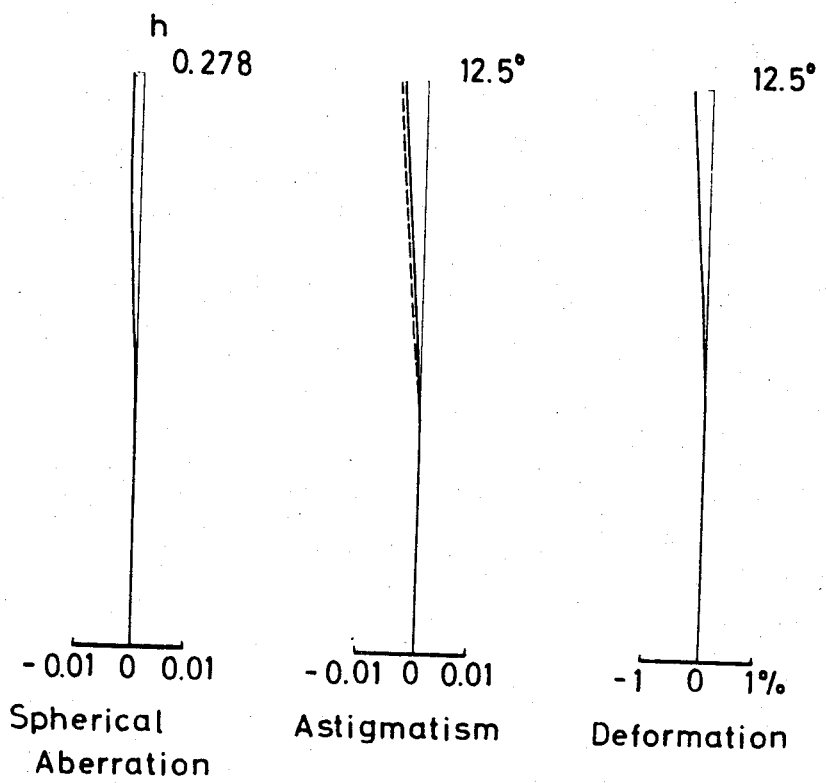

$R$: Radii of the spherical surfaces of refraction in the subsequent order $D$: Thickness of the lenses or the intervals between them as measured along the optical axis in the subsequent order $N$: Refractive index of the lens materials in the subsequent order toward light of 385 m$\mu$ $V$: Abbe's number of the lens materials in the subsequent order The present invention will be described in reference to the attached drawings in which:

FIGS. 1 and 2 show the cross-section and the aberration of a set of six lenses of the Gaussian type which embodies the present invention; and FIGS. 3 and 4 show the same as above of an other example; while FIGS. 5 and 6 show the cross-section and the aberration of an example of conventional lenses whose performance can be compared with the above two examples.

EXAMPLE 1

An example in which the first and the sixth lenses were prepared from magnesium oxide crystals:

$f=1$, $F 1.8$, $2\omega = 25°$

| | | | |
|---|---|---|---|
| $R_1 = 0.79630$ | | | |
| | $D_1 = 0.11655$ | $N_1 = 1.66145$ | $V_1 = 60.2$ |
| $R_2 = 4.7493$ | | | |
| | $D_2 = 0.00667$ | | |
| $R_3 = 0.40756$ | | | |
| | $D_3 = 0.15771$ | $N_2 = 1.66145$ | $V_2 = 60.2$ |
| $R_4 = 0.80141$ | | | |
| | $D_4 = 0.04627$ | $N_3 = 1.67605$ | $V_3 = 35.3$ |
| $R_5 = 0.27571$ | | | |
| | $D_5 = 0.24781$ | | |
| $R_6 = -0.32208$ | | | |
| | $D_6 = 0.05284$ | $N_4 = 1.69025$ | $V_4 = 33.8$ |
| $R_7 = -3.4037$ | | | |
| | $D_7 = 0.12607$ | $N_5 = 1.76603$ | $V_5 = 53.5$ |
| $R_8 = -0.46386$ | | | |
| | $D_8 = 0.00667$ | | |
| $R_9 = 1.3658$ | | | |
| | $D_9 = 0.14961$ | $N_6 = 1.76603$ | $V_6 = 53.5$ |
| $R_{10} = -1.4862$ | | | |

EXAMPLE 2

An example in which the first and the second lenses were prepared from magnesium oxide crystals:

$f=1$, $F 1.8$, $2\omega = 25°$

| | | | |
|---|---|---|---|
| $R_1 = 0.94228$ | | | |
| | $D_1 = 0.10824$ | $N_1 = 1.76603$ | $V_1 = 53.5$ |
| $R_2 = 3.7726$ | | | |
| | $D_2 = 0.00667$ | | |
| $R_3 = 0.44182$ | | | |
| | $D_3 = 0.16047$ | $N_2 = 1.76603$ | $V_2 = 53.5$ |
| $R_4 = 1.1606$ | | | |
| | $D_4 = 0.04627$ | $N_3 = 1.67605$ | $V_3 = 35.3$ |
| $R_5 = 0.27657$ | | | |
| | $D_5 = 0.22383$ | | |
| $R_6 = -0.33973$ | | | |
| | $D_6 = 0.04627$ | $N_4 = 1.69025$ | $V_4 = 33.8$ |
| $R_7 = -1.4846$ | | | |
| | $D_7 = 0.210834$ | $N_5 = 1.66145$ | $V_5 = 60.2$ |

$R_8 = -0.43632$
$D_8 = 0.00667$
$R_9 = 1.2403$
$D_9 = 0.17651$   $N_6 = 1.66145$   $V_6 = 60.2$
$R_{10} = -1.1505$

Seidel's coefficients of aberration in connection with the above examples are shown in the following tables.

First Example:

| No. | I | II | III | P | V |
|---|---|---|---|---|---|
| 1 | 0.5166 | 0.1036 | 0.0208 | 0.5004 | 0.1045 |
| 2 | 0.0386 | −0.1380 | 0.4934 | −0.0839 | −1.4634 |
| 3 | 0.3740 | 0.0578 | 0.0089 | 0.9774 | 0.1524 |
| 4 | −0.0017 | 0.0051 | −0.0153 | 0.0066 | 0.0262 |
| 5 | −0.6247 | −0.3121 | −0.1559 | −1.4641 | −0.8094 |
| 6 | −1.5842 | 0.7979 | −0.4019 | −1.2689 | 0.8415 |
| 7 | 0.0017 | 0.0079 | 0.0376 | −0.0075 | 0.1436 |
| 8 | 0.7816 | −0.2542 | 0.0827 | 0.9358 | −0.3312 |
| 9 | −0.0012 | −0.0142 | −0.1636 | 0.3172 | 1.7728 |
| 10 | 0.6303 | −0.2744 | 0.1194 | 0.2921 | −0.1791 |
| Σ | 0.1310 | −0.0206 | 0.0260 | 0.2050 | 0.2580 |

Second Example:

| No. | I | II | III | P | V |
|---|---|---|---|---|---|
| 1 | 0.3460 | 0.1429 | 0.0590 | 0.4605 | 0.2145 |
| 2 | 0.0151 | −0.0750 | 0.3728 | −0.1150 | −1.2819 |
| 3 | 0.3543 | 0.0865 | 0.0211 | 0.9822 | 0.2451 |
| 4 | 0.0342 | −0.0619 | 0.1119 | −0.0262 | −0.1551 |
| 5 | −0.8378 | −0.4099 | −0.2006 | −1.4591 | −0.8121 |
| 6 | −1.5771 | 0.8395 | −0.4469 | −1.2026 | 0.8781 |
| 7 | −0.0000 | −0.0006 | −0.0095 | 0.0069 | −0.0435 |
| 8 | 0.9469 | −0.2808 | 0.0832 | 0.9129 | −0.2954 |
| 9 | −0.0009 | −0.0054 | −0.0308 | 0.3211 | 1.6659 |
| 10 | 0.8255 | −0.2501 | 0.758 | 0.3462 | −0.1279 |
| Σ | 0.1062 | −0.0146 | 0.0362 | 0.2269 | 0.2877 |

FIGS. 1 and 2 show the cross-section and the aberration of the first example, and FIGS. 3 and 4 show the same as above of the second example, while FIGS. 5 and 6 show the cross-section and the aberration of an example of Gaussian lens system of the same use in which aberrations were corrected to the maximum extent by using conventional glass instead of magnesium oxide crystals. In comparison the substantially same order of corrected aberrations is obtained with the three examples. However, this correction is achieved by the conventional lens system composed of seven pieces of lens without using magnesium oxide crystals. The same result is obtained by the examples of this invention composed of six pieces of lens, eliminating a positive lens using magnesium. This eliminates one positive lens. Therefore, the outer diameter and the total length of the system can be decreased, and further the transparency toward shorter wavelengths can be remarkably improved because of the use of magnesium oxide crystals instead of lanthanum glass. The term "passive lens" is used herein in contradistinction to "positive lens." The term may be replaced by "negative lens."

What is claimed is:

1. A photographic lens assembly comprising first lens means including a positive meniscus lens convex on the side facing an object and having faces with respective radii $R_1$ and $R_2$; second lens means including a positive lens and a negative lens joined together to form a forward face, an interface, and a rear face with respective radii $R_3$, $R_4$ and $R_5$; third lens means including a positive meniscus lens and a companion lens joined together to form a forward face, a second interface, and a rear face with respective radii $R_6$, $R_7$ and $R_8$, said third lens means being concave as a whole on the side facing an object; and fourth lens means including a lens convex on both surfaces thereof and having respective radii $R_9$ and $R_{10}$, said lens means being coaxially aligned along an optical axis, said lenses having respective faces spaced from each other by distances $D_1...D_9$ respectively along the optical axis from the lens from said first lens means to the lens of said fourth lens means, the material of said lenses from said first lens means to said fourth lens means having respective refractive indices $N_1...N_6$ with respect to light having a wavelength 385 m$\mu$, said lenses in said first lens means through said fourth lens means having lens materials with respective Abbe's numbers $V_1...V_6$, said assembly having an overall focal length of one, said assembly having an overall aperture ratio F/1.8, said lenses meeting the following conditions:

$f = 1$    F 1.8,    $2\omega = 25°$
$R_1 = 0.79630$
  $D_1 = 0.11655$    $N_1 = 1.66145$    $V_1 = 60.2$
$R_2 = 4.7493$
  $D_2 = 0.00667$
$R_3 = -0.40756$
  $D_3 = 0.15771$    $N_2 = 1.66145$    $V_2 = 60.2$
$R_4 = 0.80141$
  $D_4 = 0.04627$    $N_3 = 1.67605$    $V_3 = 35.3$
$R_5 = 0.27571$
  $D_5 = 0.24781$
$R_6 = -0.32208$
  $D_6 = 0.05284$    $N_4 = 1.69025$    $V_4 = 33.8$
$R_7 = -3.4037$
  $D_7 = 0.12607$    $N_5 = 1.76603$    $V_5 = 53.5$
$R_8 = -0.46386$
  $D_8 = 0.00667$
$R_9 = 1.3658$
  $D_9 = 0.14961$    $N_6 = 1.76603$    $V_6 = 53.5$
$R_{10} = -1.4862$ 2. A photographic lens assembly comprising first lens means including a positive meniscus lens convex on the side facing an object and having faces with respective radii $R_1$ and $R_2$; second lens means including a positive lens and a negative lens joined together to form a forward face, an interface, and a rear face with respective radii $R_3$, $R_4$ and $R_5$; third lens means including a positive meniscus lens and a companion lens joined together to form a forward face, a second interface, and a rear face with respective radii $R_6$, $R_7$ and $R_8$, said third lens means being concave as a whole on the side facing an object; and fourth lens means including a lens convex on both surfaces thereof and having respective radii $R_9$ and $R_{10}$, said lens means being coaxially aligned along an optical axis, said lenses having respective faces spaced from each other by distances $D_1...D_9$ respectively along the optical axis from the lens from said first lens means to the lens of said fourth lens means, the material of said lenses from said first lens means to said lens means having respective refractive indices $N_1...N_6$ with respect to light having a wavelength 385 m$\mu$, said lenses in said first lens means through said fourth lens means having lens materials with respective Abbe's numbers $V_1...V_6$, said assembly having an overall focal length of one, said assembly having an overall aperture ratio F/1.8, said lenses meeting the following conditions:

$f = 1$,    F 1.8,    $2\omega = 25°$
$R_1 = 0.94228$
  $D_1 = 0.10824$    $N_1 = 1.76603$    $V_1 = 53.5$
$R_2 = 3.7726$
  $D_2 = 0.00667$
$R_3 = 0.44182$
  $D_3 = 0.16047$    $N_2 = 1.76603$    $V_2 = 53.5$
$R_4 = 1.1606$
  $D_4 = 0.04627$    $N_3 = 1.67605$    $V_3 = 35.3$
$R_5 = 0.27657$
  $D_5 = 0.22383$
$R_6 = -0.33973$
  $D_6 = 0.04627$    $N_4 = 1.69025$    $V_4 = 33.8$
$R_7 = -1.4846$
  $D_7 = 0.12834$    $N_5 = 1.66145$    $V_5 = 60.2$
$R_8 = -0.43632$
  $D_8 = 0.00667$
$R_9 = 1.2403$
  $D_9 = 0.17651$    $N_6 = 1.66145$    $V_6 = 60.2$
$R_{10} = -1.1505$

* * * * *